United States Patent
Talmor et al.

(10) Patent No.: US 11,809,861 B2
(45) Date of Patent: Nov. 7, 2023

(54) DEVELOPMENT ENVIRONMENT ORGANIZER WITH ENHANCED STATE SWITCHING AND SHARING

(71) Applicant: Red Hat, Inc., Raleigh, NC (US)

(72) Inventors: Avraham Talmor, Ra'anana (IL); Ilan Gersht, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/342,885

(22) Filed: Jun. 9, 2021

(65) Prior Publication Data
US 2022/0398093 A1 Dec. 15, 2022

(51) Int. Cl.
*G06F 8/71* (2018.01)
*G06F 11/36* (2006.01)

(52) U.S. Cl.
CPC ............ *G06F 8/71* (2013.01); *G06F 11/3664* (2013.01); *G06F 11/3688* (2013.01); *G06F 11/362* (2013.01)

(58) Field of Classification Search
CPC .... G06F 8/71; G06F 11/3664; G06F 11/3688; G06F 11/362
See application file for complete search history.

(56) References Cited

U.S. PATENT DOCUMENTS

| | | | |
|---|---|---|---|
| 6,061,711 A | 5/2000 | Song et al. | |
| 7,370,281 B2 * | 5/2008 | Weber | G06F 8/20 719/329 |
| 7,565,519 B1 * | 7/2009 | Kumar | G06F 8/71 713/1 |
| 7,890,919 B1 * | 2/2011 | Williams | G06F 8/71 717/113 |
| 8,171,489 B2 | 5/2012 | Liu et al. | |
| 8,365,140 B2 | 1/2013 | Heyhoe et al. | |
| 8,862,545 B2 | 10/2014 | Demiroski et al. | |
| 9,003,365 B1 * | 4/2015 | Vogelheim | G06F 9/46 717/121 |

(Continued)

FOREIGN PATENT DOCUMENTS

EP 3629107 4/2020

OTHER PUBLICATIONS

J. desRivieres and J. Wiegand, "Eclipse: A platform for integrating development tools," 2004, IBM Systems Journal, vol. 43, No. 2, p. 371-383 (Year: 2004).*

(Continued)

*Primary Examiner* — Douglas M Slachta
(74) *Attorney, Agent, or Firm* — Lowenstein Sandler LLP

(57) ABSTRACT

Disclosed herein is technology to capture and restore a state of a development environment. An example method may include: determining, by a processing device, a state of a first development environment, wherein the first development environment displays content of a set of files that correspond to a program modification; storing state data that represents the state of the first development environment, wherein the state data identifies the files in the set; receiving a request to update a second development environment; and updating, using the state data, a state of the second development environment, wherein the updated state of the second development environment displays the content of the set of files corresponding to the program modification.

20 Claims, 5 Drawing Sheets

(56) References Cited

U.S. PATENT DOCUMENTS

| | | | |
|---|---|---|---|
| 9,063,742 B1* | 6/2015 | Bienkowski | G06F 8/71 |
| 9,395,979 B1* | 7/2016 | Bullukian | G06F 8/71 |
| 9,553,766 B2* | 1/2017 | Janke | H04L 43/04 |
| 9,557,881 B1* | 1/2017 | Jain | G06T 11/206 |
| 9,575,733 B2* | 2/2017 | Leue | G06F 8/34 |
| 9,652,225 B1* | 5/2017 | Bohn | G06F 11/3089 |
| 10,223,075 B2* | 3/2019 | Bohn | G06F 11/362 |
| 10,614,419 B2 | 4/2020 | Guo et al. | |
| 10,852,905 B1* | 12/2020 | Guzman | H04M 1/72454 |
| 2006/0230136 A1* | 10/2006 | Ma | G06F 16/113 |
| | | | 709/224 |
| 2007/0113218 A1* | 5/2007 | Nolan | G06F 11/362 |
| | | | 717/124 |
| 2008/0028048 A1* | 1/2008 | Shekar | H04L 41/0856 |
| | | | 709/223 |
| 2008/0222606 A1* | 9/2008 | Solirov | G06F 8/71 |
| | | | 717/122 |
| 2010/0281458 A1* | 11/2010 | Paladino | G06F 8/71 |
| | | | 717/136 |
| 2012/0159434 A1* | 6/2012 | Dang | G06F 8/751 |
| | | | 717/120 |
| 2013/0212562 A1* | 8/2013 | Fox | G06F 8/65 |
| | | | 717/120 |
| 2013/0339365 A1* | 12/2013 | Balasubramanian | G06F 16/24578 |
| | | | 707/E17.061 |
| 2014/0282400 A1* | 9/2014 | Moorthi | G06F 9/45558 |
| | | | 717/122 |
| 2016/0274995 A1* | 9/2016 | Klein | G06F 11/3608 |
| 2017/0097822 A1* | 4/2017 | DeLuca | G06F 8/71 |
| 2019/0212990 A1* | 7/2019 | Kulkarni | G06F 8/433 |
| 2020/0050431 A1* | 2/2020 | Zilouchian Moghaddam | G06F 8/38 |
| 2020/0225938 A1* | 7/2020 | Yuki | G06F 8/71 |
| 2020/0285462 A1* | 9/2020 | Sabath | G06F 8/33 |
| 2021/0117308 A1 | 4/2021 | Burgos | |

OTHER PUBLICATIONS

Extended European Search report for Application No. 21188112.3 dated January 2,5 2022, 11 pages.

Parnin, Chris et al, "Resumption Strategies for Interrupted Programming Tasks", Georgia Institute of Technology, Atlanta, GA, USA, Aug. 10, 2010, http://citeseerx.ist.psu.edu, 8 pages.

* cited by examiner

DEVELOPMENT ENVIRONMENT ORGANIZER WITH ENHANCED STATE SWITCHING AND SHARING

TECHNICAL FIELD

The present disclosure is generally related to integrated development environments (IDEs) and version control systems, and is more specifically related to a development environment that can more efficiently switch between development projects that use different versions of source code.

BACKGROUND

Integrated development environments (IDEs) enhance the speed and efficiency of computer programming by providing a user application that enables computer programmers to create, modify, build, and test a computer program. An IDE can provide a single integrated user interface that interacts with one or more development tools, such as, a text editor, a syntax checker, a compiler, a debugger, and a version control system. The version control system can store different versions of source code for one or more computer programs. The IDE can integrate with the version control system and enable a computer programmer to access and modify different versions of the source code.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
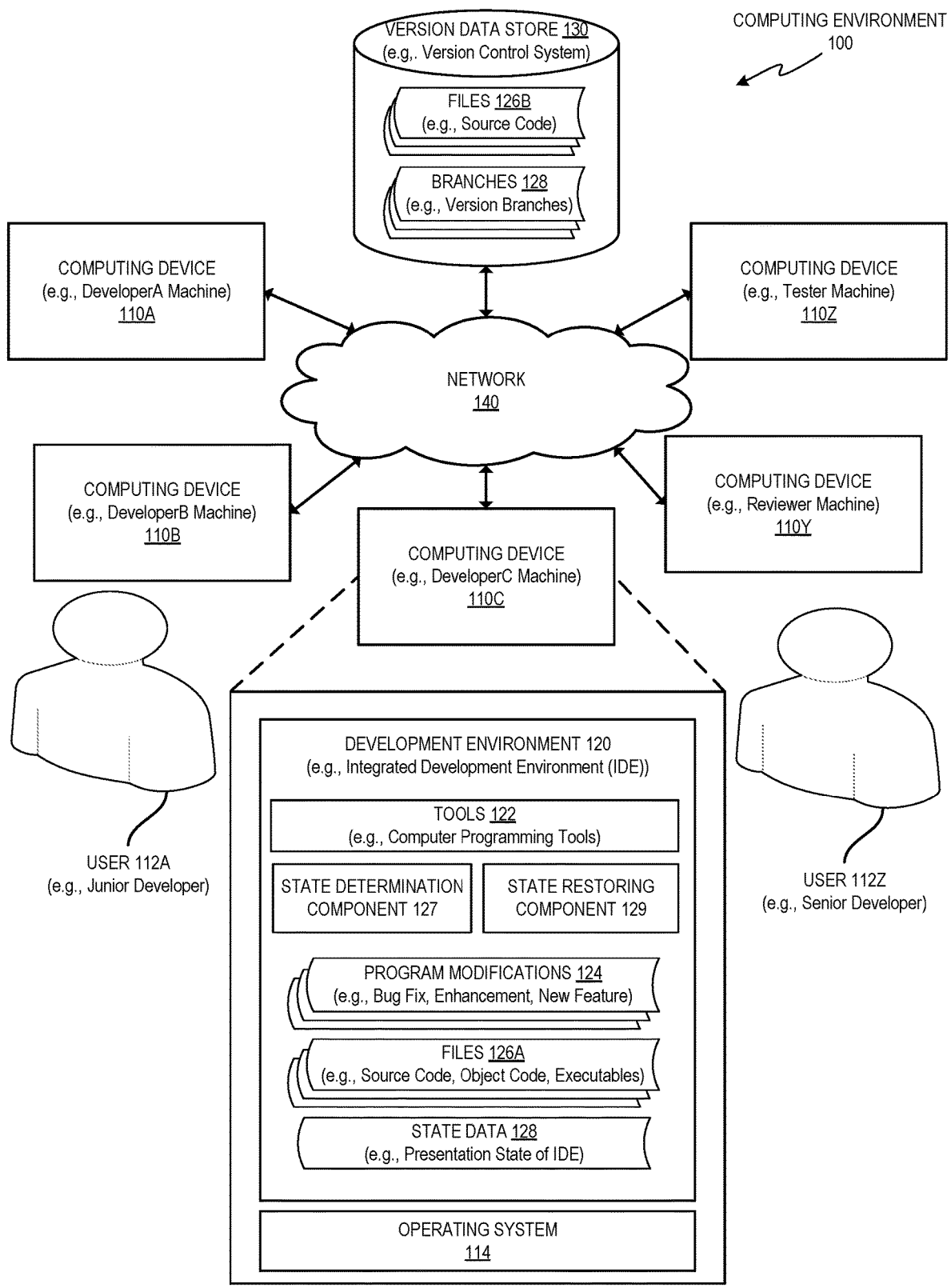
FIG. 1 depicts a high-level block diagram of an example computing environment, in accordance with one or more aspects of the present disclosure.

Modern computer programming often involves using a development environment to make modifications to computer programs. The program modifications may include defect fixes, new features, or other enhancement and may involve changing one or more files (e.g., source code files). The development environment may integrate with multiple development tools and may be referred to as an integrated development environment (IDE). The development environment may enable a user to perform many program modifications and the user may want to switch back and forth between different program modifications for a variety of reasons. For example, a user may start a program modification and be interrupted to work on a more urgent program modification. The user may also or alternatively choose to work on another program modification while waiting for a build to complete, for a testing resources to become available, or for assistance from a colleague.

Working on a program modification may involve working with many different files and tools and switching between program modifications may be time consuming and error prone. This may be further compounded when the different program modifications correspond to different versions of the same files or the single program modification is accessed by multiple users. The multiple users may include one or more developers, reviewers, testers, product managers, other users, or a combination thereof. In one example, a user may use the same development environment for working on many program modifications and may switch between the program modifications to avoid being idle. In another example, a user may use multiple development environments and a first development environment may be on a first computing device and a second development environment on a second computing device. The user may switch between the development environments to perform the program modification or to ensure that the program modification works on different computing devices (e.g., different hardware architectures, kernel versions, operating systems, applications, configurations, etc.). In yet another example, the different development environments may be used by different users. The different users may want to quickly access the same program modification and may do so for the same development task or for a different development task (e.g., development, review, test, build, integrate, or deploy).

Version control systems are often used to organize program modifications and can display the change set associated with each program modification. The version control system can include tools that display the set of files and may even display the lines of the files that have changed. But the change set is often just a portion of the files that are accessed when working on a program modification. There may be many other files that are related to the program modification and are accessed to work on the program modification but are not changed. For example, there may be files that are accessed for syntax checking, compiling, linking, execution, initialization, debugging, testing, documenting, other reason, or a combination thereof. Some of these files may not be part of the change set because they are not modified or they are not under version control (e.g., temporary files). Having these other files available when switching to the program modification may be advantageous.

Aspects of the present disclosure address the above and other deficiencies by providing technology that stores a state of a development environment and enables the same development environment or a different development environment to be updated based on the stored state. In one example, the same development environment may capture a particular state before the user switches to another program modification and may restore the particular state when switching back from the other program modification. In another example, the development environment may capture the state and share the state so that another development environment can be updated based on the state. In either example, the development environment can capture the state by generating state data and storing the state data. The state date can indicate the opened files (e.g., displayed files), modified files (e.g., change set), accessed files (e.g., files for syntax check or build), temporary files (e.g., build artifacts), tools (e.g., debug points), run time status (e.g., memory of executable under test), or other attribute. The state data can be persistently stored on the local computing device (e.g., local storage), on another computing device (e.g., peer device or network storage), in a version control system (e.g., repository), other location, or a combination thereof.

The systems and methods described herein include technology that enhances the technical field of computer programing. In particular, aspects of this technology can increase the effectiveness of development environments by enabling computer programmers to work more efficiently on different program modification in parallel. The technology enables a development environment to be setup to work on a program modification more quickly and reduces the manual overhead involved in switching between program modifications. In one example, the program modifications may involve different versions of the same source code and the different version may be displayed using the same file names, which can cause confusion. This technology can reduce the confusion by reducing or avoiding the user's need to manually close and open files, tools, or other features of the development environment. In other aspects, this technology can reduce the consumption of computing resources by avoiding the need to keep everything opened or running when working on multiple program modifications. In the past, the developers may enable quick switching by concurrently running an instance of an IDE for each program modification and the instances may be on the same desktop or on different desktops or devices. This is unnecessary when the user can more efficiently switch between the program modifications. As a result, there are less programs running and files open, which reduces the memory resources, temporary storage resources, I/O resources, processing resources, other computing resources, or a combination thereof.

Various aspects of the above referenced methods and systems are described in details herein below by way of examples, rather than by way of limitation. The examples provided below discuss development environments for working with human readable source code. In other examples, the development environments can be used to work on other files that may include non-human readable code (e.g., object code, micro code), graphical images (e.g., icons, logos, photos, pictures), executable images (e.g., VM images, container images), documentation, other files, or a combination thereof.

FIG. 1 illustrates an exemplary computing environment 100 in which implementations of the disclosure may operate. Computing environment 100 may be a development platform that enables users to design, create, edit, configure, test, and deploy computer programs. In one example, computing environment 100 may be development platform that uses native applications, web-based applications, cloud based applications, other applications, or a combination thereof. The development platform may be the same or similar to RedHat® OpenShift®, Microsoft® Azure Devops®, Oracle® Application Express® (APEX), other development platform, or a combination thereof. In the example illustrated, computing environment 100 may include one or more computing devices 110A-Z, a development environment 120, a version data store 130, and a network 140.

Computing devices 110A-Z may include desktop computers, laptop computers, mobile phones, tablet computers, other personal computing devices, server computers, or a combination thereof. In some implementations, computing device 110 may be referred to as a "client device" or "user device" and be associated with one or more users 112A-Z. Users 112A-Z may be human beings that are functioning in one or more development roles (e.g., designer, developer, reviewer, tester, manager, or documenter) and performing one or more development tasks (e.g., design, development, reviewing, testing, verifying, documenting). Each of the computing devices 110A-C may execute an operating system (e.g., operating system 114).

Operating system 114 may be any program or combination of programs that are capable of managing computing resources of computing device 110C. Operating system 114 may include a kernel comprising one or more kernel space programs (e.g., memory driver, network driver, file system driver) for interacting with virtual or physical hardware devices. In one example, operating system 114 may include Linux®, Solaris®, Microsoft Windows®, Apple Mac®, other operating system, or a combination thereof. Each of the computing devices 110A-Z can provide a development environment 120 for a respective user.

Development environment 120 may include one or more applications that enable a user to work on a computer program. The one or more applications can include a user interface that is provided to the user to working on program modification for one or more computer program. The work can involve any one or more of the development tasks discussed above and can include editing, reviewing, testing, debugging, or a combination thereof. The user interface can be a graphical interface (e.g., graphical user interface (GUI)), a textual interface (e.g., command line interface (CLI)), audio interface, camera interface, or a combination thereof. Develop environment 120 may integrate with one or more tools 122 and be referred to as an integrated development environment (IDE). The integrated development environment may be a computer program that provides one or more user interfaces that enable a user to interact with the tools. Examples of integrated development environments include, for example, Eclipse®, PyCharm®, Microsoft Visual Studio®, Apple Xcode®, Oracle NetBeans®, IBM Rational Application Developer®, GNU Emacs®, Jupyter Notebook®, other IDE or development tool, or a combination thereof.

Tools 122 may be used for developing the computer program and may be referred to as development tools or computer programming tools. Tools 122 may include one or more text editors, syntax checkers, compilers, linkers, interpreters, debuggers, testing tools, version control system, bug tracking system, build automation tools, deployment tools, modeling tools, class browser, an object browser, and a class hierarchy diagram, simulators, emulators, virtual machines, containers, other tools, or a combination thereof. Each of the tools 122 may be one or more standalone computer programs or may be computer programs that are integrated with another computer program (e.g., plug-in for IDE, web application for web browser). Tools 122 of the development environment 120 can be used to work on program modifications 124.

Program modifications 124 can include any modification to one or more computer programs. A computer program may be an executable program that can be executed by a processor and runs in user mode (e.g., user program), system mode (e.g., system program), other mode, or a combination thereof. A modification to the computer program may involve modifying source code data, executable code data, settings data, other data, or a combination thereof. The source code data may include a collection of words in a human-readable programming language that can be transformed from text (e.g., source code) into executable code for execution by a computing device. Source code data may be transformed by an assembler, compiler, linker, interpreter, other tool, or a combination thereof. The executable code data may include machine code that can be directly or indirectly executed by a processor of a computing device. The executable code data may include program data (e.g., executable or library), package data (e.g., an installation file), executable image data (e.g., virtual machine image, container image, or hard disk image), other data, or a combination thereof. The settings data may include configurable settings that effect source code or executable code.

Files 126A-B may be storage objects that store the source code data, executable code data, settings data, other data, or a combination thereof. In one example, files 126A may be source code files and include the source code data in human readable form. Files 126A-B may include the changes associated with one or more program modifications 124. In the example shown in FIG. 1, files 126A may be stored in computing device 110C and may be specific versions of files 126B that are stored in version data store 130.

Version data store 130 may be a data store that stores files 126B and each of files 126B may include one or more versions. Version data store 130 may be referred to as a source code repository, a program repository, a package repository, an image repository, a document repository, other repository, or a combination thereof. Version data store 130 may include a single data storage device or multiple storage devices and may store data as one or more file system objects (e.g., files, directories), database objects (e.g., records), data blobs (e.g., continuous or non-continuous bit series), other data storage objects, or a combination thereof.

Version data store 130 may be a decentralized data store, a centralized data store, or a combination thereof. In the example shown in FIG. 1, version data store 130 may be a centralized content store that provides centralized access to files and specific versions of files 126B are accessed by computing device 110C and stored as files 126A. In another example (not shown), version data store 130 may be a decentralized content store that distributes files 126B across one or more storage devices (e.g., computing devices 110A-Z).

Version data store 130 may be associated with a version control service that is accessible to development environment 120 and is used to track program modifications 124. The version control service may be the same or similar to a Revision Control System (RCS), a Software Configuration Management system (SCM), a Source Code Control System (SCCS), a Version Control System (VCS), other system, or a combination thereof. In one example, the version control service may be the same or similar to GIT (e.g., content addressable storage), Apache Subversion® (SVN), Concurrent Versions System (CVS®), Bit Keeper®, Perforce®, AccuRev®, ClearCase®, Rational Team Concert®, Visual SourceSafe®, other product or service, or a combination thereof.

Development environment 120 may enable a computing device to access version data store 130 using content addressable storage, location addressable storage, or a combination thereof. Content addressable storage (CAS) may be data storage that stores and retrieves objects (e.g., files) based on the content of the object and not the storage location of the object. The identifiers used to retrieve objects may be the same or similar to object hashes and may be a direct representation of the content of the object. For example, a content addressable storage identifier may be a hash of one or more files and a modification of the content of the file causes the hash to be recomputed. Object hashes can include one or more hash values that may be generated by one or more hash function and may represent portions of data. Content addressable storage may be a permanent storage analogue to content-addressable memory and may be intended to store data that does not change or changes infrequently. When the stored objects remain unchanged, the content addressable storage may be referred to as Fixed Content Storage (FCS). In one example, version data store 130 may be a decentralized content addressable storage system that is the same or similar to the GIT distributed version control system and computing device 110C may access versions of files 126B using object hashes as identifiers.

Location addressable storage is different from content addressable storage and may store and retrieve versions of files 126B based on location identifiers as opposed to content identifiers. The location identifier may identify a particular location where the versioned code object is being stored and may be independent from the content of the stored version. Whether the content is changed after it is stored may have no effect on the location identifier used to retrieve the stored version. A location identifier may identify a file based on a file name or storage path (e.g., relative or absolute path) or may identify a record based on a key (e.g., object identifier (OLD)) and neither the file name, storage path, or key may be effected when the content of the file or record is changed. In either content addressable storage or location addressable storage, version data store 130 may organize the versions of files using branches 136.

Branches 136 may enable files to be changed in parallel by isolating changes on a branch from changes on another branch. Each of the branches 136 may be the same or similar to a stream and may function as a parent branch, a child branch, or a combination thereof. A branch may be specific to a set of one or more program modifications (e.g., bug fixes or enhancements), users (e.g., developers, IT administrators), locations (e.g., geographically separated sites), entities (e.g., teams or companies), other separation, or a combination thereof. One of branches 136 may be referred to as a main branch or trunk branch because it may be absent a parent branch and may not be based on any other branch. A branch may be both a child branch and a parent branch and may be created by a user (e.g., developer A) to isolate changes for a particular program modification (e.g., bug fix A). Each branch may branch out from any point on another branch and multiple branches may branch from the same point or different points. The point may be on the parent branch and may be a particular version. For example, a branch may branch from a base version on a parent branch. Branches 136 may correspond to version relationship data.

Version relationship data may represent the relationship of a version to other versions or branches (e.g., child branch, parent branch, grandparent branch). The version relationship data may be derived from a version tree data structure and be stored in version data store 130. The version relationship data may be used to integrate changes of a program modification across branches (e.g., push, deliver, rebase). The integration may propagate changes between branches of a tree data structure and may create a new version on a destination branch that will include changes from a source branch. The integration may involve one or more operations that include copying, moving, merging, removing, adding, other operation, or a combination thereof.

Development environment 120 may include a state determination component 127 and a state restoring component 129. State determination component 127 may enable the development environment 120 to determine a state of development environment 120 that is associated with a particular one of the program modifications 124. Development environment may store the state as state data 128 and use state restoring component 129 to update a development environment to work on the particular program modification. State determination component 127 and state restoring component 129 are discussed in more detail below in regards to FIG. 2.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
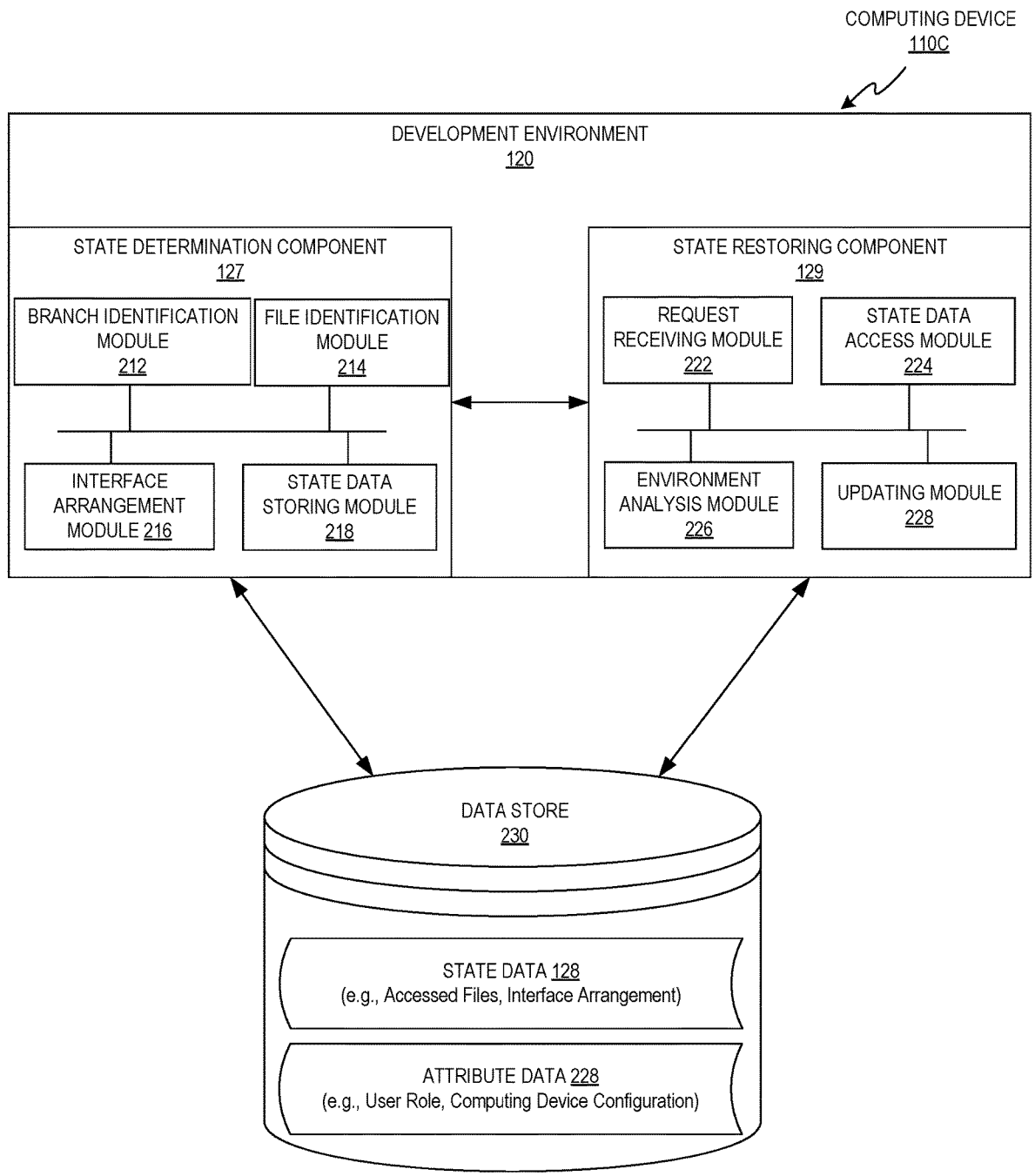
FIG. 2 depicts a block diagram of an example computing device with a development environment, in accordance with one or more aspects of the present disclosure.

FIG. 2 is a block diagram illustrating example components and modules that may enable computing device 110 to capture and restore a state of a development environment, in accordance with one or more aspects of the present disclosure. Computing device 110 may include a state determination component 127 and a state restoring component 129 for analyzing and updating states of development environment 120. In the example shown, the components, modules, and features are executed by a single computing device 110 and can be used to capture and restore a state to the same instance of a development environment. In another example, the components, modules, and features can be executed on different computing devices and a first computing device may execute the state determination component 127 to capture the state and a second computing device may execute the state restoring component 129 to restore the state to a development environment on the second computing device.

State determination component 127 may enable computing device 110 to determine the state of development environment 120 at a particular point in time or over a duration of time. Development environment 120 may be highly customizable by the user and can be used to access content and present the content to the user. The state of development environment 120 may correspond to what content the development environment is accessing (e.g., files, tools, branches), where the development environment is displaying the accessed content (e.g., user interface arrangement), why the development environment is accessing or processing the content (e.g., editing, compiling, testing, executing), and how to enable the user to work with the content to perform a program modification. In the example illustrated, state determination component 127 may include a branch identification module 212, a file identification module 214, an interface arrangement module 216, and a state data storing module 218.

State determination component 127 may determine the state of development environment 120 using modules 212, 214, 216, 218, and one or more other program features, functions, or utilities. In one example, state determination component 127 may query the development environment using one or more operations (e.g., API function, command line utility) and the operation may return data representing the state of the development environment (e.g., opened files, change set, current branch). In another example, state determination component 127 may monitor and track the state using one or more event handlers may be integrated with development environment 120, operating system 114, tools 122, other portion of computing device 110, or a combination thereof. The event handlers may listen for one or more particular events (e.g., open file, window reposition, branch change, debug initiation) and may analyze the events and generate, update, merge, or store the data.

Branch identification module 212 may enable computing device 110 to identify one or more branches 136 that are associated with a particular program modification. Branches may be a data structure of a version control system and may be used to organize changes to files. A branch may be associated with a particular program modification or a group of modifications and can have a one-to-one relationship (e.g., bug fix branch, new feature branch). Branch identification module 212 may identify the branch by communicating with the version control service (e.g., plug-in client for version control system) to identify one or more branches associated with the program modification. The interacting may involve executing one or more operations (e.g., commands or functions) that indicate the branch identifier (e.g., name or ID).

File identification module 214 may enable computing device 110 to identify the files that are accessed to work on the program modification. Identifying the files may involve identifying files that are associated with a program modification, which includes files that are accessed by development environment 120 while the user is working on the program modification. Accessing a file may can include inspecting a file metadata (e.g., checking if file exists), inspecting file content (e.g., reading content of file), opening a file for editing (e.g., acquiring a write lock), displaying attributes or content of a file, changing a file, other operation, or a combination thereof. File identification module 214 may identify the files based on a temporal attribute.

The temporal attribute may correspond to the program modification and may be a point in time or a duration of time. The times can relate to a time the program modification started, paused, resumed, ended, an intermediate time, or a combination thereof. In one example, file identification module 214 may identify all of the files that are being accessed (e.g., open and displayed) at a point in time that development environment 120 receives a request to switch to a different program modification. In another example, file identification module 214 may identify all of the files that have been accessed over a duration of time. The duration of time may be a predetermined period of time (e.g., prior minute, hour, day, week, month) or may be relative to the particular program modification, such as a period that began when the program modification was started (e.g., activated, resumed) and ended when the request to switch to a different program modification was initiated, transmitted, or received. The period of time may also be based on a branch and when the branch type was created or when an instance of the branch was applied to one or more files (e.g. new version created, checkout, checkin).

Interface arrangement module 216 may enable computing device 110 to identify the arrangement of the user interface provided by development environment 120. As discussed above, the user interface can include on or more graphical user interfaces (GUIs), command line interfaces (CLIs), other interface, or a combination thereof. The user interface may include one or more interface elements that function as display elements, control elements, or a combination thereof. A display element may provide graphical output with or without being able to receive user input. The graphical output may be in the form of one or more graphics that include text (e.g., letters, numbers, or other characters), images (e.g., illustrations, drawings, photos, pictures, motion pictures, videos), or a combination thereof. A control element may be configured to receive user input with or without providing a graphical output. The interface elements of a graphical user interface can be referred to as graphical elements and can include one or more windows, panels, tabs, toolbars, tables, lists, buttons, labels, input fields, other elements, or a combination thereof. The interface elements can be organized into an arrangement and presented to the user.

The arrangement of the user interface may be based on the layout of the interface elements and the content being presented by development environment 120 to the user. Each of the interface elements can include a location within the user interface. The location (e.g., position) can be a relative location to another graphical element or may be an absolute location that is based on a coordinate system. The location can correspond to a particular location on a canvas, screen, other rendering surface, or a combination thereof. The arrangement can include one or more user interfaces that are displayed sequentially or concurrently to the user. Each of the user interfaces may correspond to one or more files, tools, or tasks. For example, the arrangement of the user interface may include a first user interface for a first tool (e.g., text editor) and a second user interface for a second tool (e.g., class explorer, debugger, version control client). The first user interface may include one or more interface elements that correspond to different aspects of the first tool (e.g., different tab for each source code file) and the second user interface may include one or more interface elements that correspond to the second tool (e.g., window panel for debug variables and executable output).

State data storing module 218 may enable computing device 110 to analyze data of modules 212, 214, 216, and 218 and generate state data 128 that represents the state of development environment 120. State data 128 may represent the runtime state of the development environment and may be referred to as runtime state data. Likewise, state data 128 may correspond to the presentation of content by user interface and be referred to as a presentation state data or user interface state data. State data 128 may also represent the configuration or settings of the development environment and may be referred to as configuration state data. In one example, state data 128 may include data that identifies particular files, versions, branches, dependencies, tools, graphical elements, interface arrangements, running processes, settings, configurations, users, user roles, other aspect of development environment, or a combination thereof.

State data storing module 218 may store state data 128 at a persistent data storage location that is local to computing device 110, remote from computing device 110, or a combination thereof. State data storing module 218 may persistently store state data 128 local to the computing device by storing it in data store 230 as a file, serialized object, other storage object, or a combination thereof. State data storing module 218 may persistently store state data 128 remote from the computing device by storing it in version data store 130 of a version control system. State data 128 may be stored in a data structure of the version control system that is a versioned object (e.g., file under source control) or in an un-versioned object (e.g., a commit object, message, or note).

State data storing module 218 may use serialization or deserialization operations when storing or accessing the state data. The serialization operations may translating a state or data structure into a format that can be stored on a persistent storage device or transmitted over a computer network (e.g., shared). The output of the serialization operation can be a series of bits (e.g., bit sequence) that can be used as input to a deserialization operation. The output of the deserialization operation may be a semantically similar state, as discussed below (e.g., clone of an original state).

State restoring component 129 may enable computing device 110 to update development environment 120 based on state data 128. As discussed above, the development environment that is being updated by be the same or may be different from the development environment that state data 128 was derived from. In one example, the first development environment and the second development environment may be the same identical development environment at different points in time (e.g., same IDE instance). In another example, the first development environment and the second development environment may be different development environments (e.g., different IDE instances) that are running on different computing devices, for different users, or a combination thereof. In either example, state restoring component 129 may include a request receiving module 222, a state data access module 224, an environment analysis module 226, and an updating module 228.

Request receiving module 222 may enable computing device to receive and process requests of the user. The requests may be initiated by the user using one or more interface elements (e.g., button, menu option, command line command) and may relate to one or more program modifications. Each of the requests may cause the development environment to switch to a particular program modification, switch from a particular program modification, or a combination thereof. The requests may be referred to as switch requests, user requests, other request, or a combination thereof. In one example, request receiving module 222 may receive a first request to switch from a program modification associated with a first branch (e.g. original modification) to a second program modification associated with a second branch (e.g., new modification). Request receiving module 222 may subsequently receive a second request to switch to the program modification associated with the first branch (e.g., from the new modification back to the original modification). Request receiving module 222 may process the requests and cause state determination component 127 to store the state data for the current state before, during, or after initiating a transition to a different state. The transition to the different state may involve initiating state data access module 224.

State data access module 224 may enable computing device 110 to access the state data that will be used to update development environment 120. State data access module 224 may access the state data from a storage location local to computing device 110 (e.g., data store 230), from a location remote from computing device 110 (e.g., version data store 130), or a combination thereof. State data access module 224 may access the state data in response to a request of a user (e.g., a switch request), a file, tool, or program modification being accessed, a branch being loaded, other user or device operation, or a combination thereof. As discussed above, the state data may be shared between different development environments using a version control system and state data access module 224 may receive the state data from version data store 130.

Environment analysis module 226 may enable computing device 110 to analyze a development environment before, during, or after the development environment is updated. The analysis may involve determining attributes of the development environment that include attributes of the user, attributes of the computing device, or a combination thereof. The attributes of the user may include one or more user roles (e.g., developer, reviewer, tester, manager), experience (e.g., junior developer, senior developer, kernel developer, application developer, web developer), ownership (e.g., custodian of a particular program module), identifier (e.g., user name, account, ID), group membership (e.g., department, division, company), other attribute of a user, or a combination thereof. The attributes of the computing device may relate to the configuration of the computing device 110 and include one or more installed programs (e.g., applications, development tools), operating systems (e.g., Linux, Unix, Macintosh, Windows), hardware architectures (e.g., x86, ARM®, PowerPC®, S390®), memberships (e.g., domains, networks), files (e.g., opened, displayed, cached, downloaded) other attributes, or a combination thereof.

Environment analysis module 226 may generate attribute data 228 that represents (e.g., identifies, indicates) the determined attributes. Attribute data 228 may be same or similar to state data 128 and state data 128 may be based on the first development environment (e.g., original IDE) and attribute data 228 may be based on the second development environment, which may be same or different from the first development environment.

Updating module 228 can enable computing device 110 to update a state of development environment 120 based on state data 128, attribute data 228, other data, or a combination thereof. Updating module 228 may update the development environment to be in the same state that development environment 120 was in when the state data 128 was determined. States that are the same can be semantically similar and may or may not be identical. Semantically similar states may be similar enough to enable a user to continue working on a prior program modification after submitting a request (e.g., click a button) and avoid performing additional manual steps to return to the prior state. Semantically similar states of the development environment do may not be associated with the same process identifiers (PIDs), memory locations, sockets, handles, processors, computing devices, users, or other attributes in order to be semantically similar. The process of updating the state of the development environment may be the same or similar to replacing a current state, merging states, applying or reapplying the state, configuring or reconfiguring the state, other change to the development environment, or a combination thereof. For example, the updating may involve changing one or more attributes of the current development environment to work on a particular program modification and may close or keep open one or more other program modifications that were being worked on.

Updating module 228 may compare one or more states to determine a set of updates to apply to a development environment. For example, updating module 228 may compare a first state (e.g., original state) with a second state (e.g., current state) to determine which portions of the development environment to update. Comparing the states may involve comparing the state data 128 (e.g., original state) with attribute data 228 (e.g., current state). The comparison may occur before, during, or after the update is initiated and may identify the set of updates that can be applied to the current state of the development environment to make it appear and function in manner that is the same or similar to the prior state. The set of updates may include user interface updates (e.g., displaying, hiding, resizing, moving, or removing interface elements), file updates (e.g., opening files, closing files, replacing files, updating content with different file version), branch updates (e.g., changing branches, creating branches), tool updates (e.g., launching tools, configuring tools), executable updates (e.g., initiating executables for debug or testing), other updates to the development environment, or a combination thereof.

Updating module 228 may also or alternatively update the development environment based on state data 128 and the resulting state may be different from an original state (e.g., not semantically similar). This may be intentional when the attributes of the development environment being updated are different from the original development environment. For example, when the development environment being updated corresponds to a different computing device, user, development task, job role, other difference, or a combination thereof. In one example, a first development environment may execute on a computing device with a first attribute (e.g., x86) and a second development environment may execute on a computing device with a second attribute (e.g., ARM) and the different computing devices may be used by the same developer or different developers (e.g., cross platform development scenario). In another example, a first development environment may be used by a first developer (e.g., kernel developer) to make a first portion of the program modification and a second development environment may be used to by a second developer (e.g., application developer) to make a second portion of the program modification (e.g., team development scenario). In yet another example, a first development environment may be used to make the program modification and a second development environment may be used to assist (e.g., explain or debug code), review (e.g., code review), integrate (e.g., push or deliver changes), test (e.g., regression test, system test, functional test), or deploy the program modification. This technology can be used in other scenarios or a combination of scenarios.

Updating module 228 may use state data 128 to initialize development environment 120 before the user requests to switch to a program modification or begins working on the program modification. Initializing development environment 120 may involve downloading over a network, loading into memory, caching, launching, or otherwise preparing one or more files, tools, or other aspect of development environment 120. The development environment 120 may be used to work on large computer programs that involve a large set of files and tools. But the program modification may involve a sub set of those files and tools. The set of files may include the files that changed (e.g., change set) but can also be much larger and include other files that are accessed to work on the program modification but are not changed. For example, there may be files that are accessed for syntax checking, compiling, linking, execution, initialization, debugging, testing, documenting, other reason, or a combination thereof.

Initializing the development environment with the subset may take a large amount of time and updating module 228 can reduce this time. Updating module can reduce the time by beginning the initialization before the user requests to switch program modifications. For example, the computing device 110 or version control system can determine the next program modification and start the initialization based on an existing queue (e.g., user's work queue or colleagues work queue), historical switching (e.g., every day user works on this program modification in the morning), other predictive technology (e.g, predictive modeling), or a combination thereof. This may be advantageous because it may further enhance the speed at which users can switch between program modifications.

Figure 3:
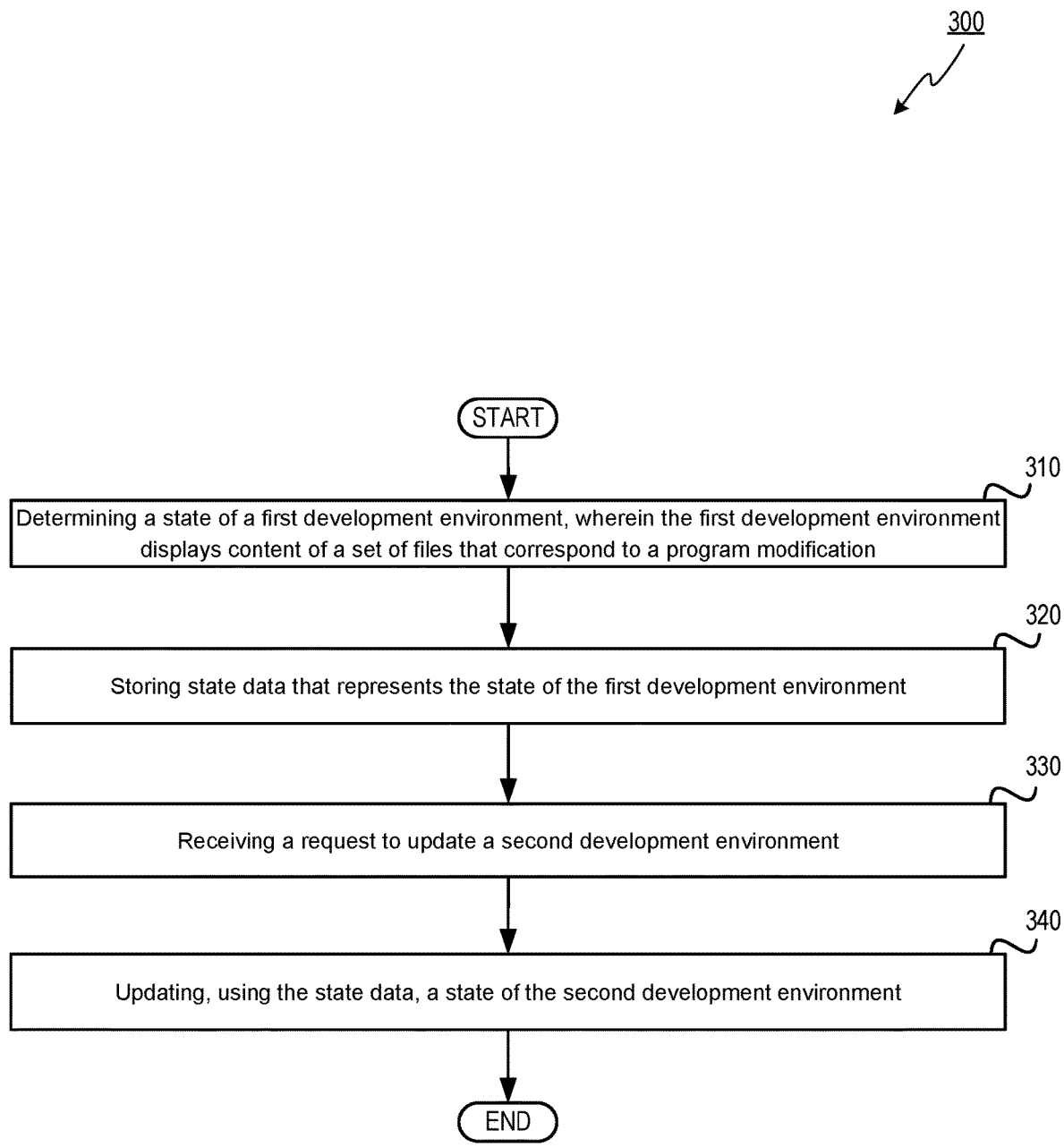
FIG. 3 depicts a flow diagram of an example method for determining and updating states of the development environment, in accordance with one or more aspects of the present disclosure.

FIG. 3 depicts a flow diagram of one illustrative example of a method 300 for determining and updating states of a development environment, in accordance with one or more aspects of the present disclosure. Method 300 and each of its individual functions, routines, subroutines, or operations may be performed by one or more processors of a computing device executing the method. In certain implementations, method 300 may be performed by a single computing device. Alternatively, methods 300 may be performed by two or more computing devices, each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by components 127 and 129 as shown in FIGS. 1 and 2.

Method 300 may be performed by processing devices of a client device or a server device and may begin at block 310. At block 310, a processing device may determine a state of a first development environment. The first development environment can display content of a set of files that correspond to a program modification. The development environment may be an integrated development environment (IDE) and the set of files may include source code that is associated with a branch of a version control system. In one example, there may be a first development environment and a second development environment and they may be the same development environment at different points in time. In another example, the first development environment and the second development environment may be different development environments on different computing devices and used by the same user or different users.

At block 320, the processing device may store state data that represents the state of the first development environment. The state data may identify the files in the set and an arrangement of a user interface of the development environment. The arrangement can include multiple open files at different locations in the user interface. The state data may identify files accessed by the first development environment since the program modification started. The files that were accessed may include one or more files that include changes for the program modification and one or more files that are absent changes for the program modification. In one example, the state data can include runtime data of an executable being debugged in the first development environment and is used to restore the runtime data to the second development environment.

At block 330, the processing device may receive a request to update the second development environment. The request may be a user request and may be received after processing a first request to switch from the program modification associated with a first branch to a second program modification associated with a second branch. The first request may initiate the storing of the state data discussed above. The received request may be a second request that is initiated by the user to switch back to the program modification associated with the first branch. The second request may cause an update that uses the state data. In one example, in response to the first or second request the processing device may share (e.g., transmit or receive) the state data between the first development environment and the second development environment using a version control system. The state data may be stored with a change set in a commit object of the version control system.

At block 340, the processing device may update a state of the second development environment using the state data. The updated state of the second development environment may display the content of the set of files corresponding to the program modification. The update may involve closing versions of the files on a first branch and opening versions of the files on a second branch. In one example, the first development environment may be used to make the program modification and the second development environment may be used to review or test the program modification. In another example, the first development environment may be used to test the program modification on a first computing device and the second development environment may be used to test the program modification on a second computing device.

Figure 4:
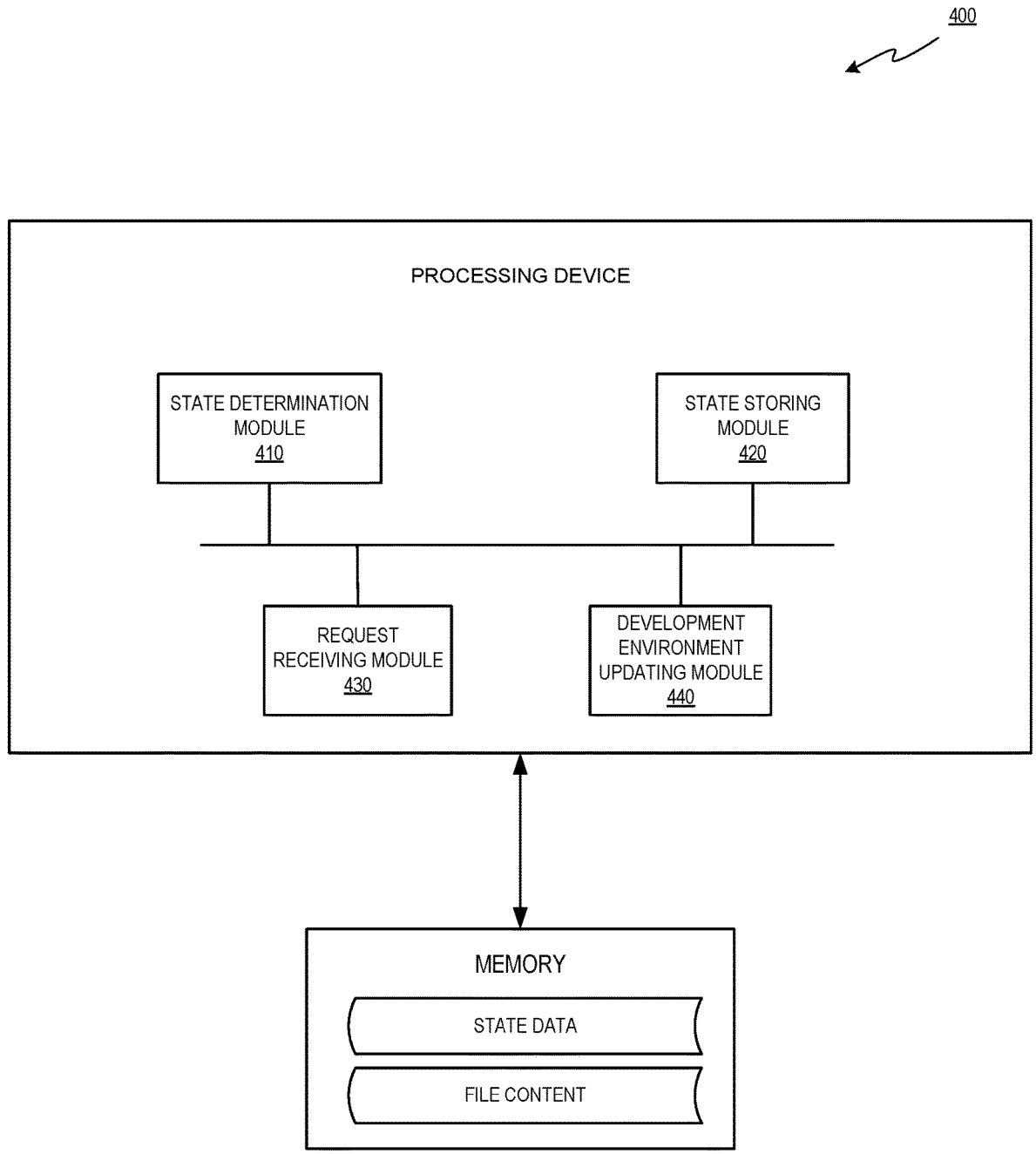
FIG. 4 depicts a block diagram of an example computing device for determining and updating states of the development environment, in accordance with one or more aspects of the present disclosure.

FIG. 4 depicts a block diagram of a computer system 400 operating in accordance with one or more aspects of the present disclosure. Computer system 400 may be the same or similar to computing device 110 or computer system 500 and may include one or more processing devices and one or more memory devices. In the example shown, computer system 400 may include a state determination module 410, a state storing module 420, a request receiving module 430, and a development environment updating module 440.

State determination module 410 may enable a processing device to determine a state of a first development environment. The first development environment can display content of a set of files that correspond to a program modification. The development environment may be an integrated development environment (IDE) and the set of files may include source code that is associated with a branch of a version control system. In one example, there may be a first development environment and a second development environment and they may be the same development environment at different points in time. In another example, the first development environment and the second development environment may be different development environments on different computing devices and used by the same user or different users.

State storing module 420 may enable the processing device to store state data that represents the state of the first development environment. The state data may identify the files in the set and an arrangement of a user interface of the development environment. The arrangement can include multiple open files at different locations in the user interface. The state data may identify files accessed by the first development environment since the program modification started. The files that were accessed may include one or more files that include changes for the program modification and one or more files that are absent changes for the program modification. In one example, the state data can include runtime data of an executable being debugged in the first development environment and is used to restore the runtime data to the second development environment.

Request receiving module 430 may enable the processing device to receive a request to update the second development environment. The request may be a user request and may be received after processing a first request to switch from the program modification associated with a first branch to a second program modification associated with a second branch. The first request may initiate the storing of the state data discussed above. The received request may be a second request that is initiated by the user to switch back to the program modification associated with the first branch. The second request may cause an update that uses the state data. In one example, in response to the first or second request the processing device may share (e.g., transmit or receive) the state data between the first development environment and the second development environment using a version control system. The state data may be stored with a change set in a commit object of the version control system.

Development environment updating module 440 may enable the processing device to update a state of the second development environment using the state data. The updated state of the second development environment may display the content of the set of files corresponding to the program modification. The update may involve closing versions of the files on a first branch and opening versions of the files on a second branch. In one example, the first development environment may be used to make the program modification and the second development environment may be used to review or test the program modification. In another example, the first development environment may be used to test the program modification on a first computing device and the second development environment may be used to test the program modification on a second computing device.

Figure 5:
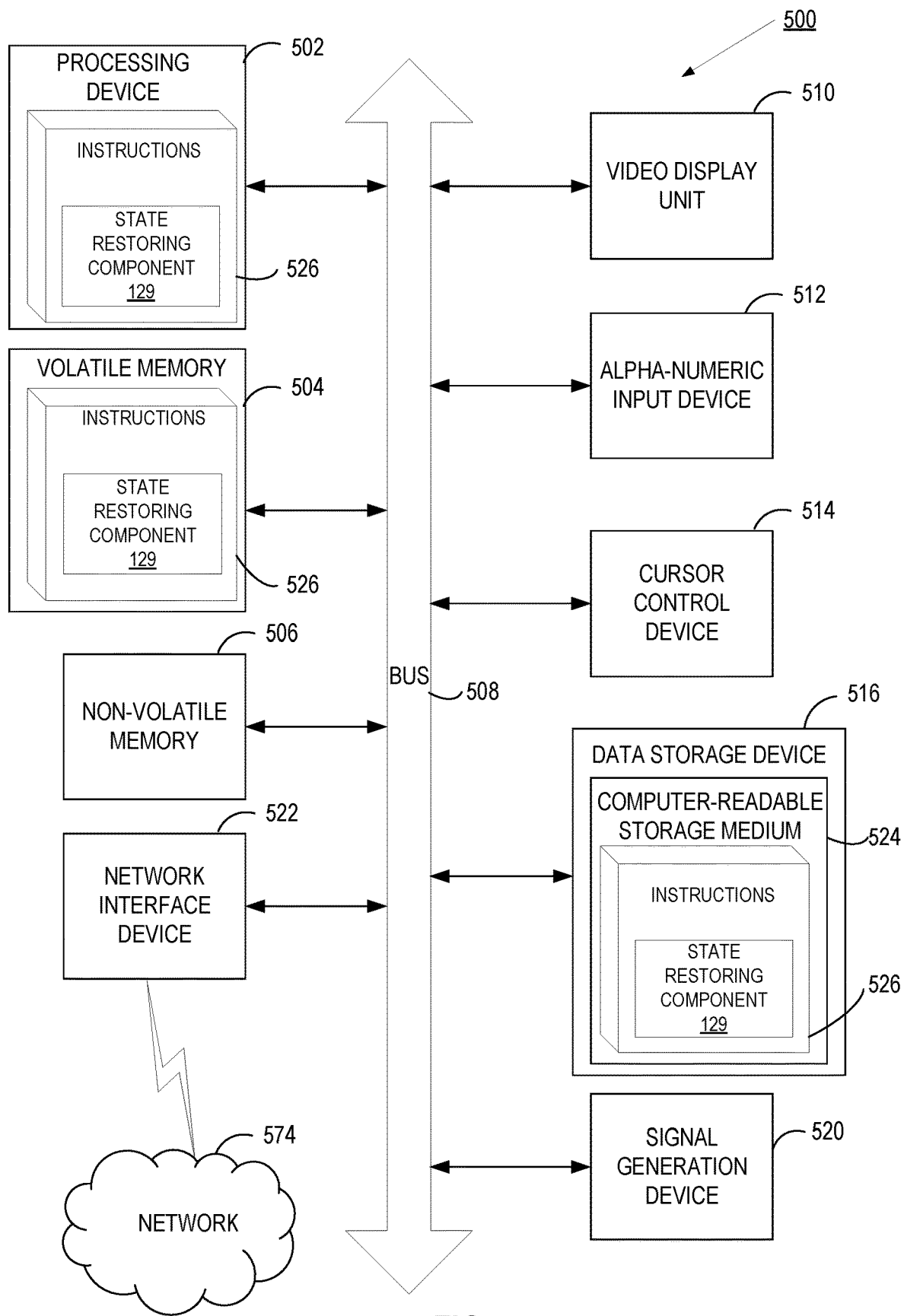
FIG. 5 depicts a block diagram of an illustrative computer system operating in accordance with the examples of the present disclosure.

FIG. 5 depicts a block diagram of a computer system operating in accordance with one or more aspects of the present disclosure. In various illustrative examples, computer system 500 may correspond to computing device 110 of FIGS. 1 and 2. Computer system 500 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing method 300 and for encoding state determination component 127 and state restoring component 129 of FIGS. 1 and 2.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "storing," "receiving," "updating," "comparing," "providing," "generating," "accessing," "indicating," "analyzing," "detecting," "transmitting," "enhancing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    receiving a first request to switch from a first program modification associated with a first branch to a second program modification associated with a second branch, storing, by a processing device, first state data corresponding to a state of a first development environment, wherein the first state data specifies user interface arrangement of accessed content, accessed content, branches of the first program modification, tools, and executables associated with a predetermined period of time during which a user was working on the first program modification;
    updating, using a second state data, at least one of: the user interface arrangement of access content, the accessed content, the branches of the second program modification, the tools, or the executables to update the state of the first development environment to reflect a state of a second development environment in which the user continues working on the second program modification; and
    responsive to receiving a second request to switch back to the first program modification associated with the first branch, updating, using the first state data, the state of the second development environment to reflect the state of the first development environment.

2. The method of claim 1, wherein the first development environment comprises an integrated development environment (IDE), and wherein the accessed content includes a set of files comprising source code and is associated with a branch of a version control system.

3. The method of claim 1, wherein the first state data comprises a plurality of files accessed by the first development environment during the predetermined period of time since the first program modification started, wherein the plurality of files comprise multiple files that include changes for the first program modification and multiple files that are absent changes for the first program modification.

4. The method of claim 1, wherein the user interface arrangement of accessed content refers to one or more open files at different locations in the user interface.

5. The method of claim 1, wherein the first development environment and the second development environment are a same development environment at different points in time.

6. The method of claim 1, wherein the first development environment and the second development environment are different development environments on different computing devices.

7. The method of claim 1, further comprising sharing the first state data and the second state data between the first development environment and the second development environment using a version control system, wherein the first state data and the second state data is stored with a change set in a commit object of the version control system.

8. The method of claim 1, wherein the first state data comprises runtime data of an executable being debugged in the first development environment and is used to restore the runtime data to the second development environment.

9. The method of claim 1, wherein the first development environment is used to make a first program modification and the second development environment is used to review or test the first program modification.

10. The method of claim 1, wherein the first development environment is used to test a first program modification on a first computing device and the second development environment is used to test the first program modification on a second computing device.

11. A system comprising:
    a memory; and
    a processing device communicably coupled to the memory, the processing device to:
        receive a first request to switch from a first program modification associated with a first branch to a second program modification associated with a second branch, storing first state data corresponding to a state of a first development environment, wherein the first state data specifies user interface arrangement of accessed content, accessed content, branches of the first program modification, tools, and executables associated with a predetermined period of time during which a user was working on the first program modification;
        update, using a second state data, at least one of: the user interface arrangement of access content, the accessed content, the branches of the second program modification, the tools, or the executables to update the state of the first development environment to reflect a state of a second development environment in which the user continues working on the second program modification; and
        responsive to receive a second request to switch back to the first program modification associated with the first branch, updating, using the first state data, the state of the second development environment to reflect the state of the first development environment.

12. The system of claim 11, wherein the first development environment comprises an integrated development environment (IDE), and wherein the accessed content includes a set of files comprising source code and is associated with a branch of a version control system.

13. The system of claim 11, wherein the first state data comprises a plurality of files accessed by the first development environment during the predetermined period of time since the first program modification started, wherein the plurality of files comprise multiple files that include changes for the first program modification and multiple files that are absent changes for the first program modification.

14. The system of claim 11, wherein the user interface arrangement of accessed content refers to one or more open files at different locations in the user interface.

15. The system of claim 11, wherein the first state data comprises runtime data of an executable being debugged in the first development environment and is used to restore the runtime data to the second development environment.

16. The system of claim 11, wherein the first development environment is used to make a first program modification and the second development environment is used to review or test the first program modification.

17. A non-transitory machine-readable storage medium storing instructions which, when executed, cause a processing device to perform operations comprising:

receiving a first request to switch from a first program modification associated with a first branch to a second program modification associated with a second branch, storing first state data corresponding to a state of a first development environment, wherein the first state data specifies user interface arrangement of accessed content, accessed content, branches of the first program modification, tools, and executables associated with a predetermined period of time during which a user was working on the first program modification;

updating, using a second state data, at least one of: the user interface arrangement of access content, the accessed content, the branches of the second program modification, the tools, or the executables to update the state of the first development environment to reflect a state of a second development environment in which the user continues working on the second program modification; and responsive to receiving a second request to switch back to the first program modification associated with the first branch, updating, using the first state data, the state of the second development environment to reflect the state of the first development environment.

18. The non-transitory machine-readable storage medium of claim 17, wherein the user interface arrangement of accessed content refers to one or more open files at different locations in the user interface.

19. The non-transitory machine-readable storage medium of claim 17, wherein the first state data comprises runtime data of an executable being debugged in the first development environment and is used to restore the runtime data to the second development environment.

20. The non-transitory machine-readable storage medium of claim 17, wherein the first development environment comprises an integrated development environment (IDE), and wherein the accessed content includes a set of files comprising source code and is associated with a branch of a version control system.

* * * * *